(12) United States Patent
Hirthe et al.

(10) Patent No.: US 7,666,958 B2
(45) Date of Patent: Feb. 23, 2010

(54) CATALYST SYSTEM CONSISTING OF A CARRIER AND OF A CO-CATALYST

(75) Inventors: Bernd Hirthe, Tonisvorst (DE); Bernd Proft, Neukirchen-Vluyn (DE); Jochen Winkler, Rheurdt (DE); Udo Blumenthal, Muhlhein/Ruhr (DE); Gerhard Fink, Muhlheim/Ruhr (DE); Klaus Hauschild, Duisburg (DE)

(73) Assignees: Sachtleben Chomie GmbH, Duisburg (DE); Studiengesellschaft Kohle MBM, Mulheim An De Ruhr (DE)

( * ) Notice: Subject to any disclaimer, the term of this patent is extended or adjusted under 35 U.S.C. 154(b) by 0 days.

(21) Appl. No.: 11/909,475

(22) PCT Filed: Mar. 24, 2006

(86) PCT No.: PCT/EP2006/061040

§ 371 (c)(1),
(2), (4) Date: Dec. 19, 2007

(87) PCT Pub. No.: WO2006/100307

PCT Pub. Date: Sep. 28, 2006

(65) Prior Publication Data

US 2008/0227935 A1    Sep. 18, 2008

(30) Foreign Application Priority Data

Mar. 24, 2005  (DE) .................. 10 2005 014 396

(51) Int. Cl.
C08F 4/18    (2006.01)
(52) U.S. Cl. .................. 526/90; 526/95; 526/125.1; 502/103; 502/132; 502/113
(58) Field of Classification Search .............. 526/124.5, 526/126, 160, 943, 90, 95, 125.1; 502/103, 502/132, 133, 113, 152, 115
See application file for complete search history.

(56) References Cited

U.S. PATENT DOCUMENTS

| 4,701,432 | A | * | 10/1987 | Welborn, Jr. ................. 502/113 |
| 5,227,440 | A |   | 7/1993  | Canich et al. |
| 5,561,095 | A | * | 10/1996 | Chen et al. ................... 502/169 |
| 5,648,580 | A |   | 7/1997  | Chen et al. |
| 6,489,410 | B1|   | 12/2002 | Carney et al. |
| 2001/0006931 | A1 | * | 7/2001 | Hirahata et al. .............. 502/152 |
| 2002/0137623 | A1 | * | 9/2002 | Gauthier et al. ............. 502/102 |
| 2004/0267073 | A1 |   | 12/2004 | Zander et al. |

FOREIGN PATENT DOCUMENTS

| EP | 1046656 |     | 10/2000 |
| EP | 1116732 | A1  | 7/2001  |
| EP | 1231225 |     | 8/2002  |
| WO | WO-03035707 | A | 5/2003 |

OTHER PUBLICATIONS

Fischbuch, et al.: "Stereospecific Polymerization of Isoprene with Molecular and MCM-48-Grafted Lanthanide(III) Tetraalkylaluminates", *Angew. Chem. Int. Ed.*, 2004, 43 2234-2239.
Taguchi, et al.: "Ordered mesoporous materials in catalysis", *Microporous and Mesoporous Materials*, 77 92005) 1-45.
Kantam, et al.: "Nanoparticle supported bis (cyclopentadienyl) zirconium dichloride catalysts for styrene polymerization", *J. of Molecular catalysis*, Chem. 340 (2005), 103-108.

* cited by examiner

*Primary Examiner*—Ling-Siu Choi
(74) *Attorney, Agent, or Firm*—Fulbright & Jaworski L.L.P.

(57) ABSTRACT

The invention relates to methods for producing cesium hydroxide solutions during which: cesium-containing ore is disintegrated with sulfuric acid while forming a cesium aluminum sulfate hydrate, which is poorly soluble at low temperatures; the formed cesium alum is separated away in the form of a solution from the solid ore residues; the aluminum is precipitated out of the cesium alum solution while forming a cesium sulfate solution; the formed cesium sulfate solution is reacted with barium hydroxide or stontium hydroxide while forming a cesium hydroxide solution, and; the formed cesium hydroxide solution is concentrated and purified.

10 Claims, 1 Drawing Sheet

Morphology of the titanium dioxide

CATALYST SYSTEM CONSISTING OF A CARRIER AND OF A CO-CATALYST

This is a §371 of PCT/EP2006/061040 filed Mar. 24, 2006, which claims priority from German Patent Application No. 10 2005 014 396.2 filed Mar. 24, 2005.

FIELD OF INVENTION

The present invention provides catalyst systems consisting of a support and a co-catalyst, and their use for olefin polymerisation.

BACKGROUND AND SUMMARY OF THE INVENTION

Titanium-containing catalyst systems for olefin polymerisation have been known for a long time. In particular, the chlorides $TiCl_4$ and $TiCl_3$ were employed for the first time by Ziegler et al. as catalysts for polyolefin synthesis using co-catalysts (e.g. triethylaluminum). Ziegler systems are currently used in the form of supported catalysts, in which the active component (e.g. $TiCl_4$ or also metallocene compounds) is deposited on supports which are inert or contain hydroxyl groups, utilising their specific properties, such as particle size, porosity, specific surface area etc. For this purpose, the supports are first prepared according to the morphological requirements, and are coated with the active components and co-catalysts in the next steps.

The object of the present invention was to develop supports having specific morphological properties, which polymerise olefins under normal pressure and at room temperature without the conventional catalyst coating.

The object was achieved according to the invention by the choice of particular powders, e.g. porous or catalytically active powders, which, as a result of the coating with a suitable co-catalyst which is known per se, can be employed as the catalyst system for olefin polymerisation.

DETAILED DESCRIPTION

Figure 1:
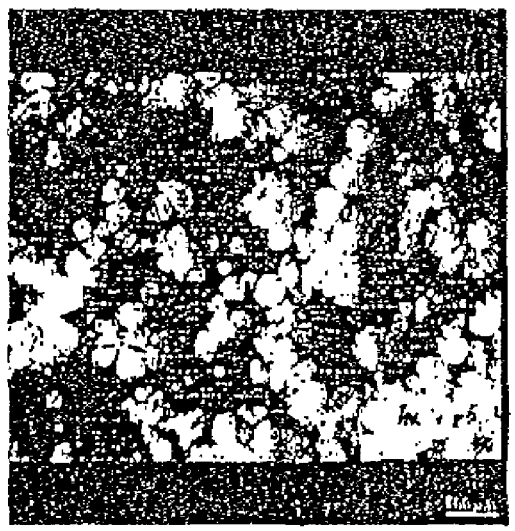
FIGS. 1 and 2 are show the morphology of the samples of titanium dioxide grades of the type E3-588-12-001 and ES-585-111-003 (manufactured by Sachtleben Chemie GmbH) as used herein and described in the description of the invention in two different magnifications.
Figure 2:
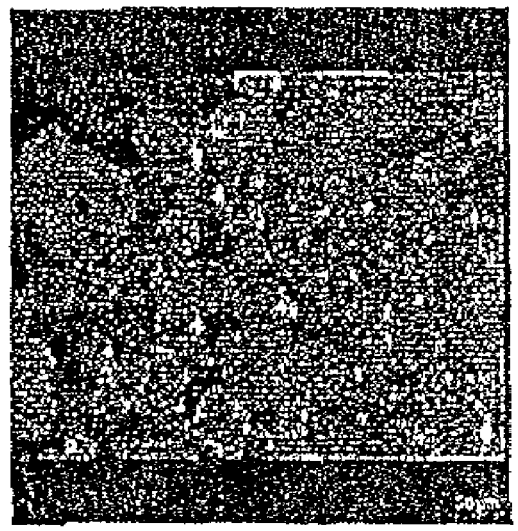

In this context, the powder can be chosen from titanium dioxide, zirconium dioxide, silicon dioxide or aluminum oxide powder. Mixtures of these powders can also be employed according to the invention. The co-catalyst can be chosen from aluminum alkyls, for example trimethylaluminum, or aluminoxanes, for example "methylaluminoxane" (MAO).

For polymerisation of olefins under normal pressure and at room temperature, the corresponding olefin is added to the catalyst systems according to the invention in an inert solvent or in the gas phase. Surprisingly, polymers are accessible in this manner.

Fine polymer powders of high bulk density and of high to ultra-high molecular weights which can be readily processed industrially are obtained with the aid of the process according to the invention. Only the powder provided according to the invention, for example the titanium dioxide, and an aluminoxane or aluminum alkyl are required as the catalyst constituent. In this context, according to the invention an exceptionally low powder-to-aluminum ratio, for example titanium-to-aluminum ratio, a ratio which was not hitherto achievable with other catalyst systems, can be established. Ratios of less than 1:1, preferably 1:0.5, are provided according to the invention. The system is also active without addition of metallocene and operates without halogens.

When the catalyst system according to the invention is employed in polymerisations, the polymerisation can be carried out in existing installations without expensive refitting. The polymerisation can also easily be carried out in the gas phase (fluidised bed or loop reactor), a very fine polymer powder likewise being obtained; surprisingly, also, no wall deposits at all are observed in the reactor in the gas-phase polymerisation.

In addition, on the basis of its morphological properties, the powder provided according to the invention, for example the titanium dioxide, can also be used as a support for other catalysts, e.g. for metallocenes. For this purpose, according to the invention the chosen powders, e.g. the titanium dioxide, are charged as a support material with metallocene and employed for "conventional" polymerisation with metallocenes fixed to a support. The additional coating of these systems with co-catalysts is also possible.

Polymerisation-active catalysts which consist exclusively of a support and a co-catalyst and, if titanium dioxide powder is used, consist exclusively of titanium dioxide and aluminum alkyls, are accessible for the first time with the present invention. Polymerisation catalysts having a Ti:Al ratio of less than 1:1 and Ziegler-type polymerisation catalysts having a Ti:Al ratio of less than 1:1, which produce more than traces of polymer, are accessible for the first time therewith.

Porous powders, e.g. porous titanium dioxide grades, are particularly suitable for the production of the catalyst systems according to the invention. Examples of these powders are the titanium dioxide grades of type E3-588-12-001 or E3-585-111-003 (manufacturer: Sachtleben Chemie GmbH).

The thermal drying and activation of the powder chosen according to the invention, e.g. of the titanium dioxide, takes place according to the invention preferably in vacuo for quantities of up to 20 grams. For this purpose, for example, the titanium dioxide is treated in a tubular oven, e.g. in a quartz tube, in vacuo at sufficiently high temperatures, e.g. at temperatures of 50-200° C., preferably at 80-130° C., for a sufficiently long period, e.g. for up to 24 h, preferably for 1 to 8 h, and cooled slowly under an inert atmosphere. The further processing and storage take place preferably under an inert gas.

The thermal drying and activation of the powder chosen according to the invention, e.g. the titanium dioxide, takes place according to the invention for larger amounts by azeotropic distillation, e.g. by addition of toluene and with boiling under reflux. The entrained water is separated off via a water separator and removed. On completion of the water separation, filtration, washing and removal of the residual solvent in vacuo, the powder chosen according to the invention, e.g. the titanium dioxide, is ready for further processing. The further processing and storage take place preferably under an inert gas.

The powder chosen according to the invention pretreated in this way, e.g. the pretreated titanium dioxide, is suspended in a solution containing the co-catalyst in a suitable solvent, e.g. in a toluene solvent. To coat the powder, the suspension is stirred and preferably heated, e.g. to 60° C., and after being cooled it is filtered, washed and dried.

When powder treated with co-catalyst is used as a support for catalysts, e.g. when titanium dioxide treated with aluminum alkyl is used as a support for metallocenes, the product thus obtained is further reacted directly.

The polymerisation of olefins with the catalyst systems according to the invention and the work-up of the polymers obtained take place by processes that are known per se to the person skilled in the art.

The following examples are intended to explain the invention in more details, without limiting it.

DESCRIPTION OF PREFERRED EMBODIMENTS

1. Preparation of the Catalyst 1.1 Titanium Dioxide

Porous titanium dioxide grades are particularly suitable for the preparation of the catalyst. Titanium dioxide grades of the type E3-588-12-001 or E3-585-111-003 (manufacturer: Sachtleben Chemie GmbH) can be mentioned by way of example.

1.2 Stage 1—Drying and Activation of the Titanium Dioxide 1.2.1 Stage 1a—Thermally In Vacuo According to the invention, the thermal drying and activation of the titanium dioxide are carried out with amounts of up to 20 grams of titanium dioxide in a quartz tube. For this, the titanium dioxide is treated in vacuo at 80-130° C. in a tubular oven for approx. 8 h and cooled slowly under an inert atmosphere. Further processing and storage took place under an inert gas.

Example 1.2.1-1

6.3 g $TiO_2$ of the Sachtleben grade E3-588-12-001 were heated up to 80° C. in a quartz tube in a tubular oven. After approx. 1 hour, a vacuum of approx. $10^{-2}$ mm Hg is applied and the temperature is increased to 130° C. After a total of 8 hours, 5.16 g of a slightly beige-coloured titanium dioxide are obtained.

1.2.2 Stage 1b—Azeotropically with Toluene as the Entraining Agent

According to the invention, the thermal drying and activation of the titanium dioxide in larger amounts are carried out by addition of toluene and with boiling under reflux. The water entrained out of the mixture is separated off via a water separator and removed. After about 8 hours, no further water separates out. After filtration, washing with pentane and removal of the residual solvent in vacuo, the titanium dioxide is ready for further processing. The further processing and storage took place an inert gas.

Example 1.2.2-1

150 g titanium dioxide of the Sachtleben grade E3-585-111-003 were boiled under reflux in 500 ml toluene for 8 hours, and approx. 9.0 ml water were separated out via a water separator. Thereafter, the titanium dioxide was filtered off, washed thoroughly with pentane and dried in the vacuum of an oil pump. Weight 143.2 g.

Elemental analysis showed a titanium content of 52.01 wt. % titanium (theoretical titanium dioxide=59.94% Ti).

1.3 Stage 2—Reaction with methylaluminoxane or trimethylaluminum

The titanium dioxide pretreated according to 1.2.1 or 1.2.2 is suspended in a toluene solution of methylaluminoxane or trimethylaluminum, the suspension is heated to 60° C. and, after cooling, filtered, and the residue is washed and dried.

Example 1.3-1

2.75 g $TiO_2$ from Example 1.2.1-1 were suspended in approx. 40 ml toluene and the suspension was stirred with a glass blade stirrer at approx. 500 rpm. A solution consisting of 9 ml of 10% strength methylaluminoxane solution in toluene (for example EURECEN AI 5100-10-toluene; manufacturer: Crompton GmbH), diluted with 20 ml toluene, was added dropwise at room temperature in the course of 20 minutes. After the dropwise addition, the mixture was heated to 110° C. and stirred for a further 4 h. After cooling of the dark blue suspension to room temperature, the suspension was further reacted directly with metallocene solution (see 1.4).

Example 1.3-2

9.72 g of a titanium dioxide dried azeotropically according to Example 1.2.2-1 were suspended in 210 ml toluene in a round-bottomed flask, and 29.16 ml of 10% strength methylaluminoxane solution in toluene (for example EURECEN AI 5100-10-toluene; manufacturer: Crompton GmbH) were added dropwise at room temperature in the course of 10 minutes, while stirring. The suspension was heated at 60° C. for 1 hour. After cooling, it was filtered and the residue was washed and dried. 14.52 g of a grey-blue powder were obtained.

Elemental analysis:

Titanium 8.20%=1.712 mAt/g

Aluminum 1.33%=0.493 mAt/g

Ti:Al ratio=1:0.29

Example 1.3-3

11.0 g of a titanium dioxide dried azeotropically according to Example 1.2.2-1 were initially introduced into a round-bottomed flask and were suspended with 5.53 ml trimethylaluminum in 240 ml toluene at room temperature, while stirring. The suspension was heated at 60° C. for 1 hour. After cooling, the suspension was filtered and the residue was washed and dried. 12.0 g of a grey-blue powder were obtained. The product was further reacted immediately for the polymerisation (see 2.2).

1.4 Stage 3—Supporting of the 2nd Stage with Metallocenes

If titanium dioxide treated with aluminum alkyl is employed as a support for metallocenes, the product obtained from stage 2 is further reacted directly as described in the following:

Example 1.4-1

A solution of 29.7 mg dimethylsilylbisindenyl zirconium dichloride is added dropwise at room temperature in the course of 5 minutes to the dark blue suspension obtained in Example 1.3-1 and the mixture is stirred overnight. After filtration, washing and drying in vacuo, 3.56 g of grey-blue powder are obtained.

2. Description of the Polymerisations 2.1. Polymerisation with Aluminoxane-Supported Titanium Dioxide 2.1.1 With methylaluminoxane in Suspension Example 2.1-1

12.14 g of a methylaluminoxane-supported titanium dioxide prepared according to Example 1.3-1 (Ti:Al=1:0.42) were suspended in 240 ml toluene, 2 ml of concentrated tri-isobutylaluminum (as a scavenger conventionally employed in polymerisations) were added and the mixture was siphoned quantitatively into a 500 ml BÜCHI® glass autoclave. The autoclave was equipped with a blade stirrer which reached almost to the base and was stirred at approx. 1,200 rpm. The argon partial pressure in the suspension was lowered by brief evacuation and the reactor was heated up to 60° C. and then charged with an ethylene pressure of 2 bar; the ethene pressure was kept constant at 2 bar. The polymerisation started immediately on addition of the ethene. After approx. 6 minutes, a continuous ethene uptake of about 150 Nml ethene per minute was established. After a polymerisation time of 3.98 h, the polymerisation was stopped by addition of methanol. At this time, the ethene uptake was still 140 Nml of ethene per minute! Total consumption of ethene 38.273 Nl, corresponding to 1.707 mol.

The polymer was worked up as follows: the contents of the reactor were diluted with about the same volume of methanol and the mixture was stirred with 5 ml of concentrated hydrochloric acid for some hours. After filtration, the polymer was washed with methanol until free from acid, filtered off and dried at 30° C. in a vacuum drying cabinet. 60.88 g of a fine white powder were finally weighed.

Mass Balance:
1.707 mol ethene=47.88 g PE
12.14 g weight of titanium dioxide catalyst 60.02 g feed
60.68 g final weight (101.9%)

Starting from the mass balance values (12.14 g of titanium dioxide in 60.68 g of product), a $TiO_2$ filling level of 20 wt. % can be calculated.

Analysis:
IR>bands for linear PE, 500-1150 $cm^{-1}$ broad absorption range of the titanium dioxide are detectable.
DSC>melting point 135° C. (peak), start of the melting process at approx. 95° C.
Bulk density: 0.23 [kg/l]

Example 2.1-2

13.7 g of a methylaluminoxane-supported titanium dioxide prepared according to Example 1.3-1 (Ti:Al=1:1) were suspended in 240 ml toluene and the further procedure was then as described in Example 2.1-1. The polymerisation starts immediately on addition of the ethene. After approx. 3 minutes, a continuous ethene uptake of about 50 Nml of ethene per minute was established. After a polymerisation time of 3.3 h, the polymerisation was stopped by addition of methanol. At this time, the ethene uptake was still 40 Nml of ethene per minute! Total consumption of ethene 10.583 Nl, corresponding to 0.472 mol. Working up of the polymer was carried out as described in Example 2.1-1. 28.42 g of a fine white powder were isolated.

Mass Balance:
0.472 mol ethene=13.24 g PE
12.64 g weight of titanium dioxide catalyst
25.88 g feed
28.42 g final weight (101.9%)

Starting from the mass balance values (12.64 g of titanium dioxide in 28.42 g of product), a $TiO_2$ filling level of 44.5 wt. % can be calculated.

Analysis:
DSC>melting point 136.5° C. (peak), start of the melting process at approx. 65° C.!
Bulk density: 0.2 [kg/l]

2.1.2 with methylaluminoxane in the Gas Phase

Example 2.1-4

On a D4 glass jacket frit, ethene was blown from the bottom on to 0.7 g of a methylaluminoxane-supported titanium dioxide prepared according to Example 1.3-2 (Ti:Al=1:0.42) at a jacket temperature of 60° C. and a fluidised bed was generated in this way. Polymerisation started immediately. When the ethene feed was stopped, a noticeable reduced pressure developed immediately in the installation! After a polymerisation time of approx. 30 minutes, 0.89 g of a fine-grained powder were isolated.

Analysis:
IR>bands for linear PE, 500-1250 $cm^{-1}$ broad absorption range of the titanium dioxide are detectable
DSC>melting point 134° C. (peak), start of the melting process at approx. 85° C.

Example 2.1-5

0.65 g of a methylaluminoxane-supported titanium dioxide prepared according to Example 1.3-2 (Ti:Al=1:0.42) were introduced into a 500 ml steel autoclave and the autoclave was charged with 7.8 bar of ethene. Polymerisation was carried out at a jacket temperature of 60° C. for 4.33 hours, without stirring. Surprisingly, no wall deposit was found in the steel autoclave. 21.7 g of finely pulverulent polymer (corresponding to 21.05 g PE=0.75 mol ethene) were finally weighed (owing to the non-optimum experimental conditions in this experiment (poor removal of heat since the mixture was not stirred), a small portion of the polymer powder was fused together). This corresponds to a catalyst activity of 7.48 g of PE per g of catalyst and hour. The titanium dioxide content/filling level is just about 3%.

Analysis:
IR>bands for linear PE are detectable. Nno titanium dioxide detectable
DSC>melting point 132° C. (peak), start of the melting process at approx. 65° C.
Bulk density: 0.35 [kg/l]

2.2 Suspension Polymerisation in Suspension with $AlMe_3$-Supported titanium dioxide Example 2.2-1

11.5 g of a trimethylaluminum-supported titanium dioxide prepared according to Example 1.3-3 (Ti:Al=1:0.42) were suspended in 240 ml toluene and the further procedure was then as described in Example 2.1-1. The polymerisation started immediately or, addition of the ethene. After approx. 2 minutes, a continuous ethene uptake of about 48 Nml of ethene per minute was established. After a polymerisation time of 2.6 h, the polymerisation was stopped by addition of methanol. At this time, the ethene uptake was still 40 Nml of ethene per minute! Total consumption of ethene 8.16 Nl, corresponding to 0.364 mol.

Mass Balance:
0.364 mol ethene=10.21 g PE
11.15 g weight of titanium dioxide catalyst 21.36 g feed
23.15 g final weight (108.4%)

Starting from the mass balance values (11.15 g of titanium dioxide in 23.15 g of product), a $TiO_2$ filling level of 48.2 wt. % can be calculated.

Analysis:
DSC>melting point 137° C. (peak), start of the melting process at approx. 65° C.
Bulk density: 0.25 [kg/l]

2.3 Suspension Polymerisation with metallocene-Supported titanium dioxide

Example 2.3-1

240 ml toluene and 2 ml of concentrated tri-isobutylaluminum were initially introduced into a 500 ml BÜCHI glass autoclave. The autoclave was equipped with a blade stirrer which almost reached the base and was stirred at approx. 1,200 rpm. The argon partial pressure in the solution was lowered by brief evacuation, the reactor was then heated up to 60° C. and the saturation equilibrium was subsequently established under an ethylene pressure of 2 bar.

240 mg of a metallocene-supported titanium dioxide prepared according to Example 1.4-1 were suspended in 7 ml toluene and the suspension was introduced, in the same way as 5 ml toluene for rinsing, into a 2-chamber catalyst injection system mounted on the reactor. The polymerisation was started by injecting in the catalyst. The polymerisation started immediately. After approx. 2 minutes, the maximum ethene uptake of about 960 Nml of ethene per minute was reached. After a polymerisation time of 1.55 h, the polymerisation was stopped by addition of methanol. At this time, the ethene uptake was still 115 Nml of ethene per minute! Total consumption of ethene 22.764 Ni, corresponding to 1.015 mol.

The catalyst activity is 126.2 g of PE per g of catalyst and hour.

Mass Balance:
1.015 mol ethene=28.48 g PE
0.240 g weight of titanium dioxide catalyst
28.72 g feed
30.28 g final weight (105.4%)

Starting from the mass balance values (0.24 g of titanium dioxide in 30.28 g of product), a $TiO_2$ filling level of 1 wt. % can be calculated.

Analysis:
IR>bands for linear PE, a hint of vinyl groups are detectable, IR crystalline content approx. 46%
DSC>melting point 132° C. (peak), start of the melting process at approx. 85° C., DSC crystallinity 65%
GPC>(universal calibration with polyolefins) Mw (D) 126,000, Mn (D) 22,800, D (Mw/Mn) 5.54
Bulk density: 0.24 [kg/l]

Example 2.3-2

The preparations are carried out as in Example 2.3-1.

156.9 mg of a metallocene-supported titanium dioxide prepared according to Example 1.4-1 were suspended in 5 ml toluene and the suspension was introduced, in the same way as 5 ml toluene for rinsing, into a 2-chamber catalyst injection system mounted on the reactor. The polymerisation is started by injecting in the catalyst. The polymerisation starts immediately. After approx. 1 minute, the maximum ethene uptake of about 985 Nml of ethene per minute is reached. After a polymerisation time of 0.89 h, the polymerisation was stopped by addition of methanol. At this time, the ethene uptake was still 187 Nml of ethene per minute! Total consumption of ethene 17.522 NI, corresponding to 0.782 mmol.

The catalyst activity is 154.4 g of PE per g of catalyst and hour.

Mass Balance:
1.015 mol ethene=21.92 g PE
0.157 g weight of titanium dioxide catalyst
22.08 g feed
24.22 g final weight (109.7%)

Starting from the mass balance values (0.157 g of titanium dioxide in 24.22 g of product), a $TiO_2$ filling level of 0.6 wt. % can be calculated.

Analysis:
DSC>melting point 135.7° C. (peak), start of the melting process at approx. 95° C., crystallinity 62%.
Bulk density: 0.12 [kg/l]

The invention claimed is:

1. A catalyst system consisting essentially of a support that is a powder coated with the co-catalyst wherein the support is a catalytically active titanium dioxide powder coated with at least one of an aluminum alkyl or an aluminoxane.

2. A catalyst system according to claim 1, wherein the co-catalyst is selected from the group consisting of trimethylaluminum and methylaluminoxane.

3. A catalyst system according to claim 1, wherein the ratio of titanium to aluminum is below 1 to 1.

4. A catalyst system according to claim 1, wherein the ratio of titanium to aluminum is 1 to 0.5.

5. A process for the preparation of a catalyst system according to claim 1, comprising thermally drying and activating the titanium dioxide powder, suspending the catalytically active power in a solution containing the co-catalyst in a solvent, wherein the suspension is stirred and optionally heated and the coated powder, after being cooled, is filtered, washed and dried.

6. A process for the preparation of a catalyst system according to claim 1, comprising thermally drying and activating the titanium dioxide powder, suspending the catalytically active powder in a solution containing the co-catalyst in a solvent, wherein the suspension is stirred filtered, washed and dried.

7. A method consisting essentially of polymerization of olefins with the catalyst system, wherein said catalyst system consists of a support that is a powder coated with the co-catalyst wherein the support is a catalytically active titanium dioxide powder coated with at least one of an aluminum alkyl or an aluminoxane.

8. A method consisting of polymerization of olefins with the catalyst system, wherein said catalyst system consists of a support that is a powder coated with the co-catalyst wherein the support is a catalytically active titanium dioxide powder coated with at least one of an aluminum alkyl or an aluminoxane.

9. A method comprising polymerization of olefins with the catalyst system, wherein said catalyst system consists of a support that is a powder coated with the co-catalyst wherein the support is a catalytically active titanium dioxide powder coated with at least one of an aluminum alkyl or an aluminoxane.

10. A method comprising polymerization of olefins with the catalyst system, wherein said catalyst system consists essentially of a support that is a powder coated with the co-catalyst wherein the support is a catalytically active titanium dioxide powder coated with at least one of an aluminum alkyl or an aluminoxane.

* * * * *